A. T. RING.
Tree-Protector.
No. 48,838. Patented July 18, 1865.
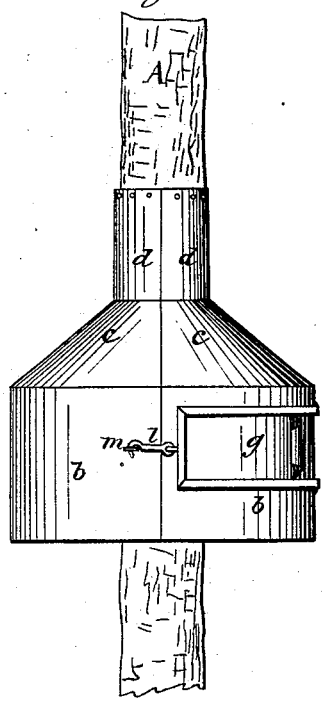
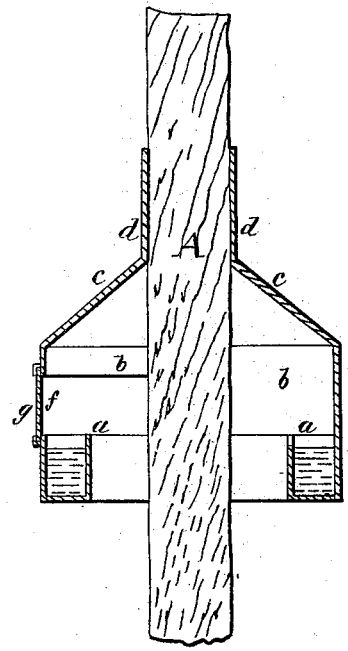
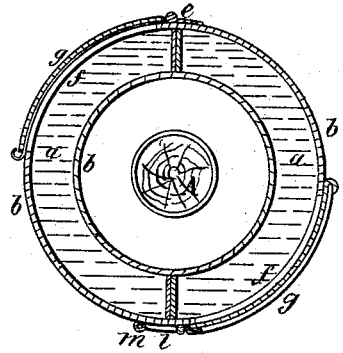
Witnesses:
Inventor:

UNITED STATES PATENT OFFICE.

ASA T. RING, OF NEWTONVILLE, MASSACHUSETTS.

IMPROVEMENT IN TREE-PROTECTORS.

Specification forming part of Letters Patent No. 48,838, dated July 18, 1865.

*To all whom it may concern:*

Be it known that I, ASA T. RING, of Newtonville, in the county of Middlesex and State of Massachusetts, have invented an Improved Tree-Protector; and I do hereby declare the same to be fully described in the following specification and represented in the accompanying drawings, of which—

Figure 1 is a side elevation, Fig. 2 a vertical section, and Fig. 3 a transverse section, of it as applied to a tree, its object being to arrest canker and other worms while ascending the tree.

In the drawings, A denotes a portion of the trunk of a tree. Two semicircular troughs, $a$ $a$, encompass the trunk and have an internal diameter larger than the diameter of the part of the trunk encircled by them. Each of the said troughs is closed at both of its ends and is placed within the lower part of one of two semi-cylindrical cases, $b$ $b$, which are hinged together at $e$, and are provided with semi-conical frustra or caps $c$ $c$, each of which is surmounted by a semi-tube, $d$. The cases also may have a hook, $l$, and eye $m$ applied to them for connecting them or holding them together when around the tree.

Through each of the cases $b$ there is an opening, $f$, provided with a closing-slide, $g$, the said opening being to enable a person to gain access to the trough below such opening in order to either supply it with a fluid or to remove such fluid and any worms or other matter that may have accumulated therein.

The apparatus so made is to clasp the trunk of the tree, and may be held thereto by either tacking or nailing either one or both of the semi-tubes $d$ thereto. Such semi-tubes may be made of lead or some other soft metal which may be easily bent to fit the tree. While ascending the tree an insect or worm will pass into the case of the apparatus and be arrested by the top thereof, down the interior surface of which he will be likely to pass until he may reach the liquid of the trough, which will prevent him from passing underneath the trough for the purpose of ascending on the outside of the case.

I do not claim a trough surrounding a tree and having a conical cap or roof over it; nor do I claim the trough, the semi-cylindrical cases, the two cones or caps, and the semi-tubes, or their equivalents, as used as a tree-protector.

What I do claim is—

The openings $f$ $f$ and slides $g$ $g$, in combination with the cases $b$ $b$, the caps $c$ $c$, the semi-tubes $d$ $d$, and the two troughs $a$ $a$, the whole being arranged substantially as described.

ASA T. RING.

Witnesses:
R. H. EDDY,
F. P. HALE, Jr.